US011236706B2

(12) United States Patent
Kato et al.

(10) Patent No.: US 11,236,706 B2
(45) Date of Patent: Feb. 1, 2022

(54) EVAPORATED FUEL TREATMENT DEVICE FOR ENGINE

(71) Applicant: MAZDA MOTOR CORPORATION, Hiroshima (JP)

(72) Inventors: Jiro Kato, Aki-gun (JP); Taketoshi Yamauchi, Aki-gun (JP); Ken Yoshida, Aki-gun (JP); Kenji Takami, Aki-gun (JP); Kazuaki Tanaka, Aki-gun (JP); Katsuya Rokuyama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/260,181

(22) PCT Filed: Jun. 18, 2019

(86) PCT No.: PCT/JP2019/024020
§ 371 (c)(1),
(2) Date: Jan. 13, 2021

(87) PCT Pub. No.: WO2020/017218
PCT Pub. Date: Jan. 23, 2020

(65) Prior Publication Data
US 2021/0310445 A1    Oct. 7, 2021

(30) Foreign Application Priority Data

Jul. 19, 2018    (JP) .............................. JP2018-135908

(51) Int. Cl.
*F02M 1/00*    (2006.01)
*F02M 25/08*    (2006.01)
(Continued)

(52) U.S. Cl.
CPC ............. *F02M 25/08* (2013.01); *F02B 37/16* (2013.01); *F02D 9/1005* (2013.01); *F02M 35/10222* (2013.01)

(58) Field of Classification Search
CPC ............. F02D 2250/02; F02D 19/0621; F02D 41/003; F02D 41/004; F02D 41/0045;
(Continued)

(56) References Cited

U.S. PATENT DOCUMENTS 9,382,825 B2    7/2016    Pursifull
9,797,322 B2    10/2017    Pursifull et al.
(Continued)

FOREIGN PATENT DOCUMENTS

JP    2018031350 A    3/2018
JP    2018031352 A    3/2018

*Primary Examiner* — John Kwon
(74) *Attorney, Agent, or Firm* — Alleman Hall Creasman & Tuttle LLP

(57) ABSTRACT

An intake passage of an engine includes a throttle valve, a supercharger, and a bypass passage connecting an upstream side with a downstream side of the supercharger and opening when the supercharger is not acting. When the supercharger is not acting, the intake passage generates forward flows in which intake air flows from the throttle valve toward the supercharger and bypass-directed flows in which the intake air is reversed due to blockage of forward movement by the supercharger and flows from the supercharger side toward a connection port, of the bypass passage, opening in the intake passage. An evaporated fuel introduction opening leading evaporated fuel produced in a fuel tank to the intake passage opens in a wall surface, on which the bypass-directed flow is generated, in the intake passage.

20 Claims, 8 Drawing Sheets

(51) Int. Cl.
  *F02M 35/10*    (2006.01)
  *F02D 9/10*     (2006.01)
  *F02B 37/16*    (2006.01)

(58) Field of Classification Search
  CPC .. F02M 25/08; F02M 25/0836; F02M 55/007; F02M 25/089; F02M 25/0872; F02M 33/02
  USPC ................................ 123/516, 518, 520, 698
  See application file for complete search history.

(56) References Cited

U.S. PATENT DOCUMENTS

| | | | |
|---|---|---|---|
| 2014/0020664 A1* | 1/2014 | Yoshioka | F02D 11/10 123/559.1 |
| 2019/0203666 A1* | 7/2019 | Asanuma | F02M 25/08 |
| 2020/0224611 A1* | 7/2020 | Honda | F02M 25/089 |
| 2021/0189978 A1* | 6/2021 | Wanibe | F02D 41/0007 |
| 2021/0262420 A1* | 8/2021 | Kato | F02M 26/19 |

\* cited by examiner

EVAPORATED FUEL TREATMENT DEVICE FOR ENGINE

TECHNICAL FIELD

The present invention relates to an evaporated fuel treatment device for an engine.

BACKGROUND ART

A supercharger may be provided to an engine of a vehicle. Patent Literature 1 discloses that in an engine in which a supercharger is installed, a bypass passage is provided which connects an upstream side with a downstream side of the supercharger in an intake passage, and a purge passage is further provided which leads evaporated fuel produced in a fuel tank to a section in the intake passage on a downstream side of a throttle valve and on an upstream side of the supercharger. In Patent Literature 1, when an action of the supercharger is stopped, a pressure in the purge passage is raised by a purge assister, and intake air reversely flowing in the bypass passage is thereby inhibited from flowing into the purge passage.

CITATION LIST

Patent Literature

Patent Literature 1: Japanese Patent Laid-Open No. 2018-31352

SUMMARY OF INVENTION

Technical Problem

Incidentally, in a state where an action of a supercharger is stopped, intake air passing through a throttle valve goes through a bypass passage and is introduced into a combustion chamber of an engine. However, a portion of the intake air containing evaporated fuel from a purge passage may enter the supercharger stopping the action and further leak to a downstream side thereof, and fuel may be accumulated in an internal portion or a downstream side of the supercharger. In such a case, when the supercharger is thereafter caused to act, the fuel accumulated in the supercharger, a downstream side thereof, and so forth is at once introduced into the combustion chamber, and an over-rich condition occurs. There is a concern that as a result, degradation of emission is caused and a torque shock is caused in a vehicle.

Accordingly, the present invention inhibits evaporated fuel from leaking from a supercharger to a downstream side thereof when the supercharger is not acting.

Solution to Problem

To solve the above problem, in the present invention, evaporated fuel related to purging is blended with an intake flow generated in an intake passage and flowing from a side of a supercharger in a non-acting state toward a bypass passage.

An evaporated fuel treatment device for an engine, the evaporated fuel treatment device being disclosed herein, includes:

an intake passage leading intake air to a combustion chamber of the engine;
a throttle valve provided in the intake passage;
a supercharger provided on a downstream side of the throttle valve in the intake passage;
a bypass passage connecting an upstream side with a downstream side of the supercharger in the intake passage on a downstream side of the throttle valve and opening when the supercharger is not acting; and
a purge passage leading evaporated fuel produced in a fuel tank to a section in the intake passage on a downstream side of the throttle valve and on an upstream side of the supercharger, and is characterized in that when the supercharger is not acting, the intake passage generates a forward flow in which the intake air flows from the throttle valve toward the supercharger and a bypass-directed flow in which the intake air is reversed due to blockage of forward movement by the supercharger and flows from a side of the supercharger toward a connection port, of the bypass passage, opening in the intake passage on an upstream side of the supercharger, and an evaporated fuel introduction opening of the purge passage opens in a wall surface, on which the bypass-directed flow is generated, in the intake passage.

When the throttle valve is opened, the forward flow is generated in which the intake air flows from the throttle valve toward the supercharger. Forward movement of the intake air is blocked by the supercharger when the supercharger is not acting, but because the bypass passage opens, the bypass-directed flow is generated in which the intake air is reversed in a position close to the supercharger and flows toward the connection port of the bypass passage. According to a flow analysis of intake air by the present inventor, when the supercharger is not acting, the forward flow and the bypass-directed flow of predetermined routes are generated in the intake passage, the forward flow and the bypass-directed flow corresponding to the positions of the throttle valve, the supercharger, and the connection port of the bypass passage, the shape of the intake passage, and so forth.

Based on this, in the evaporated fuel treatment device for an engine, the evaporated fuel introduction opening of the purge passage opens in the wall surface, on which the bypass-directed flow is generated, in the intake passage. Consequently, the evaporated fuel introduced from the purge passage into the intake passage flows from the intake passage into the bypass passage while being blended with the bypass-directed flow. Thus, the evaporated fuel can be inhibited from leaking from the supercharger in a non-acting state to a downstream side thereof, and a situation can be prevented in which an over-rich condition occurs when the supercharger thereafter acts (a situation in which degradation of emission and a torque shock are caused).

In one embodiment, the throttle valve is a valve of a butterfly type, and the connection port of the bypass passage opens in a half circumferential portion on one side of the intake passage in a case where the intake passage is divided into two portions by a plane extending in a longitudinal direction of the intake passage through an axis of a valve shaft of the throttle valve.

In a case of the throttle valve of the butterfly type, when it is partially opened, a gap between a valve plate and an inner peripheral surface of the intake passage becomes largest at respective top portions of a half circumferential portion on one side and a half circumferential portion on the opposite side of the intake passage, the half circumferential portions being opposed with each other in a direction perpendicular to the valve shaft of the throttle valve. Consequently, the forward flow is generated in which the intake air flows from the throttle valve toward the supercharger along portions around the respective top portions of the half circumferential portion on the one side and the half circumferential portion on the opposite side of the intake passage.

Because forward movement of the intake air related to the forward flow is blocked by the supercharger, the bypass-directed flow is generated in which the intake air is reversed in a position close to the supercharger and flows toward the connection port of the bypass passage. In this case, the connection port of the bypass passage opens in a wall surface of the half circumferential portion on one side of the intake passage, and in this half circumferential portion on the one side, the forward flow is generated in which the intake air moves forward along the top portion. Consequently, the intake air reversed in a position close to the supercharger moves from a portion between the forward flow along the top portion of the half circumferential portion on the one side and the forward flow along the top portion of the half circumferential portion on the opposite side toward the connection port of the bypass passage while getting through a periphery of the forward flow along the top portion of the half circumferential portion on the one side. That is, the bypass-directed flow of the intake air is generated which moves from the portion between the forward flow along the top portion of the half circumferential portion on the one side and the forward flow along the top portion of the half circumferential portion on the opposite side toward the connection port of the bypass passage while getting through the periphery of the forward flow along the top portion of the half circumferential portion on the one side.

In one embodiment, the connection port of the bypass passage opens in a top portion of the half circumferential portion on the one side of the intake passage, and the evaporated fuel introduction opening opens in side walls (a side wall in a quadrant range) of the intake passage, the side walls being opposed to each other in a valve shaft direction of the throttle valve.

Accordingly, the evaporated fuel is easily blended with the bypass-directed flow moving toward the connection port of the bypass passage while getting through the periphery of the forward flow along the top portion of the half circumferential portion on the one side of the intake passage.

It is preferable that when demarcation lines are drawn so as to extend in the circumferential direction of the intake passage while respectively passing through both ends, in the longitudinal direction of the intake passage, of the connection port of the bypass passage, at least a portion of the evaporated fuel introduction opening open in a side wall range of the intake passage, the side wall range being demarcated by both of those demarcation lines.

In one embodiment, the evaporated fuel introduction opening opens in a section in the intake passage, in which the bypass-directed flow is generated, in a vicinity of the connection port of the bypass passage. In this case, because the bypass-directed flow becomes stronger as approaching the connection port of the bypass passage, the evaporated fuel related to purging is easily led to the bypass passage.

In one embodiment, a passage portion of the intake passage from a section, in which the throttle valve is provided, to the supercharger extends in a cylinder array direction of the engine, the valve shaft of the throttle valve is substantially horizontally provided, the connection port of the bypass passage opens in a top portion of an upper half circumferential portion of the intake passage, and the evaporated fuel introduction opening opens in a section, in which the bypass-directed flow is generated, of a side wall (a side wall in a quadrant range) of the intake passage.

In this case, the forward flows of the intake air along respective top portions of the upper half circumferential portion and a lower half circumferential portion of the intake passage are generated, and the bypass-directed flow of the intake air is generated which moves from a portion between those upper and lower forward flows toward the connection port of the bypass passage while getting through both peripheries of the forward flow on an upper half circumferential side, that is, moving upward along the side wall of the intake passage. Because the evaporated fuel introduction opening of the purge passage opens in the section, in which the bypass-directed flow is generated, of the side wall of the intake passage, the evaporated fuel related to the purging is easily led to the bypass passage while being blended with the bypass-directed flow of the intake air.

In one embodiment, the evaporated fuel introduction opening opens on an upper half circumferential side of a side wall portion of the intake passage.

Because the upper half circumferential side of the side wall of the intake passage is close to the connection port of the bypass passage, the bypass-directed flow becomes strong. Thus, the evaporated fuel related to purging is easily led to the bypass passage while being blended with the bypass-directed flow of the intake air.

Furthermore, even if the intake air containing the EGR gas flows from the bypass passage into the intake passage, the EGR gas can be prevented from entering the purge passage from the evaporated fuel introduction opening. Explaining this point, the fact that the evaporated fuel introduction opening opens on the upper half circumferential side of the side wall of the intake passage means that the evaporated fuel introduction opening opens obliquely downward. Consequently, even if the intake air containing the EGR gas flows from the connection port of the bypass passage, the connection port opening in the top portion of the upper half circumferential portion of the intake passage, into the intake passage, the intake air containing the EGR gas does not directly enter the evaporated fuel introduction opening.

In one embodiment, on a downstream side of the connection port of the bypass passage, a passage cross-sectional area of the intake passage expands toward the supercharger.

When forward movement is blocked by the supercharger, the intake air attempts to flow to a portion with low resistance and easily generates a certain reversal route, in which the intake air flows to a portion with low resistance, in a position close to the supercharger due to expansion of the above passage cross-sectional area and lowering of a forward flow speed of the intake air due to this expansion. Thus, the bypass-directed flow in which the intake air flows toward the connection port of the bypass passage becomes less unstable. As a result, the evaporated fuel introduced from the evaporated fuel introduction opening is easily blended with the bypass-directed flow, and the evaporated fuel can be prevented from leaking from the supercharger to a downstream side.

Advantageous Effects of Invention

In the present invention, an intake passage is provided which generates a forward flow in which intake air flows from a throttle valve toward a supercharger and a bypass-directed flow in which the intake air flows from a supercharger side toward a connection port of a bypass passage when the supercharger is not acting, and an evaporated fuel introduction opening leading evaporated fuel from a fuel tank to the intake passage is opened in a wall surface, on which the bypass-directed flow is generated, in the intake passage. Thus, the evaporated fuel easily flows from the intake passage into the bypass passage while being blended with the bypass-directed flow, that is, the evaporated fuel can be inhibited from leaking from the supercharger in a non-acting state to a downstream side thereof. As a result, a situation can be prevented in which an over-rich condition occurs when the supercharger thereafter acts (a situation in which degradation of emission and a torque shock are caused).

DESCRIPTION OF EMBODIMENT

A form for carrying out the present invention will hereinafter be described based on drawings. The description of a preferable embodiment is substantially only exemplification and is not intended to restrict the present invention, applications thereof, or uses thereof.

<General Configuration of Engine>

Figure 1:
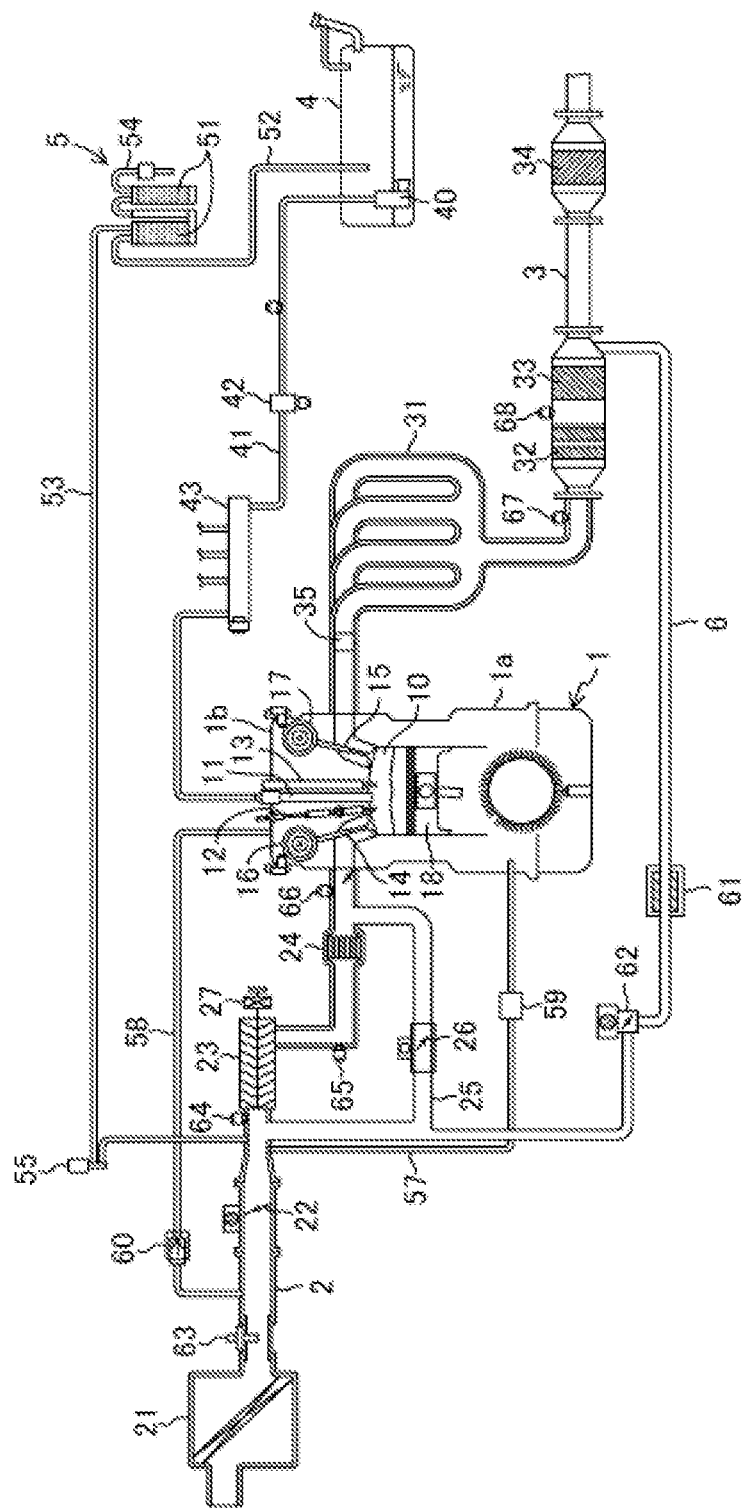
FIG. 1 is a configuration diagram of an engine system.

In a vehicle-installed engine system illustrated in FIG. 1, a reference numeral 1 denotes an engine, a reference numeral 2 denotes an intake passage of the engine 1, a reference numeral 3 denotes an exhaust passage of the engine 1, and a reference numeral 4 denotes a fuel tank. The system includes an evaporated fuel treatment device 5 leading evaporated fuel produced in the fuel tank 4 to the intake passage of the engine 1.

The engine 1 is an in-line four-cylinder compression ignition engine. FIG. 1 illustrates only one cylinder of the engine 1. The engine 1 described in this embodiment is merely one example, and in the present invention, types and specific configurations of an engine are not limited. The engine 1 includes a direct injection fuel injection valve 11, a spark plug 12, and a cylinder inner pressure sensor 13, which face a combustion chamber 10 of each cylinder. In the engine 1, an intake valve 14 is provided to an intake port, and an exhaust valve 15 is provide to an exhaust port. The engine 1 includes variable valve mechanisms 16 and 17 for respectively driving the intake valve 14 and the exhaust valve 15 to open and close. A reference numeral 18 denotes a piston of the engine 1.

The intake passage 2 includes an intake manifold (not illustrated) for introducing intake air into the combustion chambers 10 of the cylinders in a branched manner. In the intake passage 2, in order from an upstream side to a downstream side, an air cleaner 21, a throttle valve 22 adjusting an introduction amount of fresh air into the combustion chambers 10, a supercharger 23 raising a pressure of gas introduced into the combustion chambers 10, and an intercooler 24 cooling the gas introduced into the combustion chambers 10 by a supercharger 3 are disposed. Further, in the intake passage 2, a bypass passage 25 connecting an upstream side of the supercharger 23 with a downstream side of the intercooler 24 is provided on a downstream side of the throttle valve 22. In the bypass passage 25, a bypass valve 26 is provided which adjusts a flow amount of gas flowing through the bypass passage 25.

The supercharger 23 of this embodiment is a mechanical supercharger driven via a belt by a crankshaft of the engine 1. A supercharger 44 of a mechanical type may be of a Roots type, a Lysholm type, a vane type, or a centrifugal type, for example. Note that instead of a mechanical supercharger, an electric supercharger or a turbosupercharger driven by exhaust energy may be employed.

The supercharger 23 is connected with the crankshaft of the engine 1 via an electromagnetic clutch 27. Transmission and disconnection of motive power from the engine 1 to the supercharger 23 are performed by connection and disconnection of the electromagnetic clutch 27.

When the electromagnetic clutch 27 is set to a disconnected state (when the supercharger 23 is not acting), the bypass valve 26 is fully opened. Accordingly, the intake air is introduced into the combustion chambers 10 of the engine 1 by the bypass passage 25 without going through the supercharger 23. That is, the engine 1 is operated in a naturally aspirated (non-supercharging) state.

When the electromagnetic clutch 27 is set to a connected state (when the supercharger 23 is acting), a supercharging pressure is adjusted to a desired pressure by control of the bypass valve 26. That is, when the bypass valve 26 is opened, a portion of the intake air passing through the supercharger 23 goes through the bypass passage 25 and reversely flows to an upstream side of the supercharger 23. Because a reverse flow amount of the intake air changes in accordance with the opening of the bypass valve 26, the supercharging pressure of the intake air introduced into the combustion chambers 10 can be controlled.

The exhaust passage 3 includes an exhaust manifold 31 for gathering and discharging exhaust gas of the cylinders. In the exhaust passage 3 on a downstream side of the exhaust manifold 31, two catalytic converters purifying the exhaust gas are provided. The catalytic converter on an upstream side has a three-way catalyst 32 and a GPF (gasoline particulate filter) 33 and is disposed in an engine room of a vehicle. The catalytic converter on a downstream side has a three-way catalyst 34 and is disposed on the outside of the engine room. An exhaust shutter valve 35 is provided to each branch pipe of the exhaust manifold 31.

The intake passage 2 and the exhaust passage 3 are connected together by an EGR passage 6 returning a portion of the exhaust gas as EGR gas to the intake passage 2. An upstream end of the EGR passage 6 is connected with a portion in the exhaust passage 3 between the upstream catalytic converter and the downstream catalytic converter. A downstream end of the EGR passage 6 is connected with an intermediate portion of the bypass passage 25 so as to supply the EGR gas to a portion in the intake passage 2 on a downstream side of the throttle valve 22 and on an upstream side of the supercharger 23. The EGR gas enters an upstream side of the supercharger 23 in the intake passage 2 without going through the bypass valve 26 of the bypass passage 25. In the EGR passage 6, an EGR cooler 61 cooling the EGR gas and an EGR valve 62 adjusting a returning amount of the EGR gas are disposed.

The fuel tank 4 is connected with the fuel injection valves 11 by a fuel supply passage 41. An upstream end of the fuel supply passage 41 is connected with a fuel strainer 40 in the fuel tank 4. In the fuel supply passage 41, a fuel pump 42 and a common rail 43 are provided. The fuel pump 42 pumps fuel into the common rail 43. The common rail 43 stores the fuel pumped from the fuel pump 42 at a high fuel pressure. When the fuel injection valve 11 is opened, the fuel stored in the common rail 43 is injected from an injection hole of the fuel injection valve 11 into the combustion chamber 10.

The evaporated fuel treatment device 5 includes canisters 51 causing the evaporated fuel produced in the fuel tank 4 to be adsorbed onto activated carbon. The fuel tank 4 and the canisters 51 are connected together by a tank-side passage 52, and the canisters 51 and the intake passage 2 are connected together by a purge passage 53. An outside air introduction passage 54 having an atmospheric opening is connected with the canisters 51. A purge valve 55 opening and closing the purge passage 53 is provided to the purge passage 53. The purge valve 55 opens when a predetermined purge condition is satisfied, for example, in a state where an air-fuel ratio of the engine 1 can properly be controlled by control of a fuel injection amount by the fuel injection valves 11. A downstream end of the purge passage 53, that is, an evaporated fuel introduction opening 56 to the intake passage 2 will be described later.

When a negative pressure is generated on a downstream side of the throttle valve 22 in the intake passage 2 in a state where the purge valve 55 is open, the evaporated fuel collected in the canisters 51 is purged. That is, together with air introduced from the outside air introduction passage 54 into the canisters 51, the evaporated fuel is purged from the purge passage 53 to a downstream side of the throttle valve 22 in an intake passage 21. The purged evaporated fuel is supplied to the combustion chambers 10 of the engine 10 through the supercharger 23 or the bypass passage 25 and is combusted together with the fuel supplied from the fuel injection valves 11.

The engine system includes a blowby gas returning device. The blowby gas returning device includes a blowby passage 57 and an air introduction passage 58. One end of the blowby passage 57 is connected with a crankcase 1a of the engine 1, and the other end is connected with a portion of the intake passage 2 on a downstream side of the throttle valve 22 and on an upstream side of the supercharger 23. A PCV (positive crankcase ventilation) valve 59 is provided to the blowby passage 57.

The PCV valve 59 allows only gas in a direction from the crankcase 1a side to the intake passage 2 side to pass through. In a negative pressure state where the pressure on the downstream side of the throttle valve 22 in the intake passage 2 is lower than the pressure of the crankcase 1a, the opening of the PCV valve 59 changes in accordance with the extent of the negative pressure. That is, a blowby gas flow amount from the crankcase 1a to the intake passage 2 is adjusted to an appropriate amount in accordance with the negative pressure.

One end of the air introduction passage 58 is connected with the crankcase 1a via a cylinder head 1b of the engine 1, and the other end is connected with a portion of the intake passage 2 between the air cleaner 21 and the throttle valve 22. In the air introduction passage 58, a check valve 60 is provided which allows only air in a direction from the intake passage 2 side to the crankcase 1a side to pass through.

When blowby gas is released from the crankcase 1a to the intake passage 2 through the blowby passage 57, air filtered by the air cleaner 21 is introduced from the air introduction passage 58 into the crankcase 1a. Accordingly, the crankcase 1a is ventilated.

In the intake passage 2, an air flow sensor 63 detecting an intake air amount, a pressure sensor 64 detecting an intake pressure on a downstream side of the throttle valve 22 (an upstream side of the supercharger 23), a temperature sensor 65 detecting the temperature of the intake air ejected from the supercharger 23, and a pressure sensor 66 detecting the intake pressure on a downstream side of the intercooler 24 are provided, the sensors being for controlling the engine 1. In the exhaust passage 3, a linear $O_2$ sensor 67 detecting an oxygen concentration in the exhaust gas on an upstream side of the three-way catalyst 32 and a lambda $O_2$ sensor 68 detecting the oxygen concentration in the exhaust gas on a downstream side of the three-way catalyst 32 are provided.

<Structures of Engine System Configuration Elements>

Figure 2:
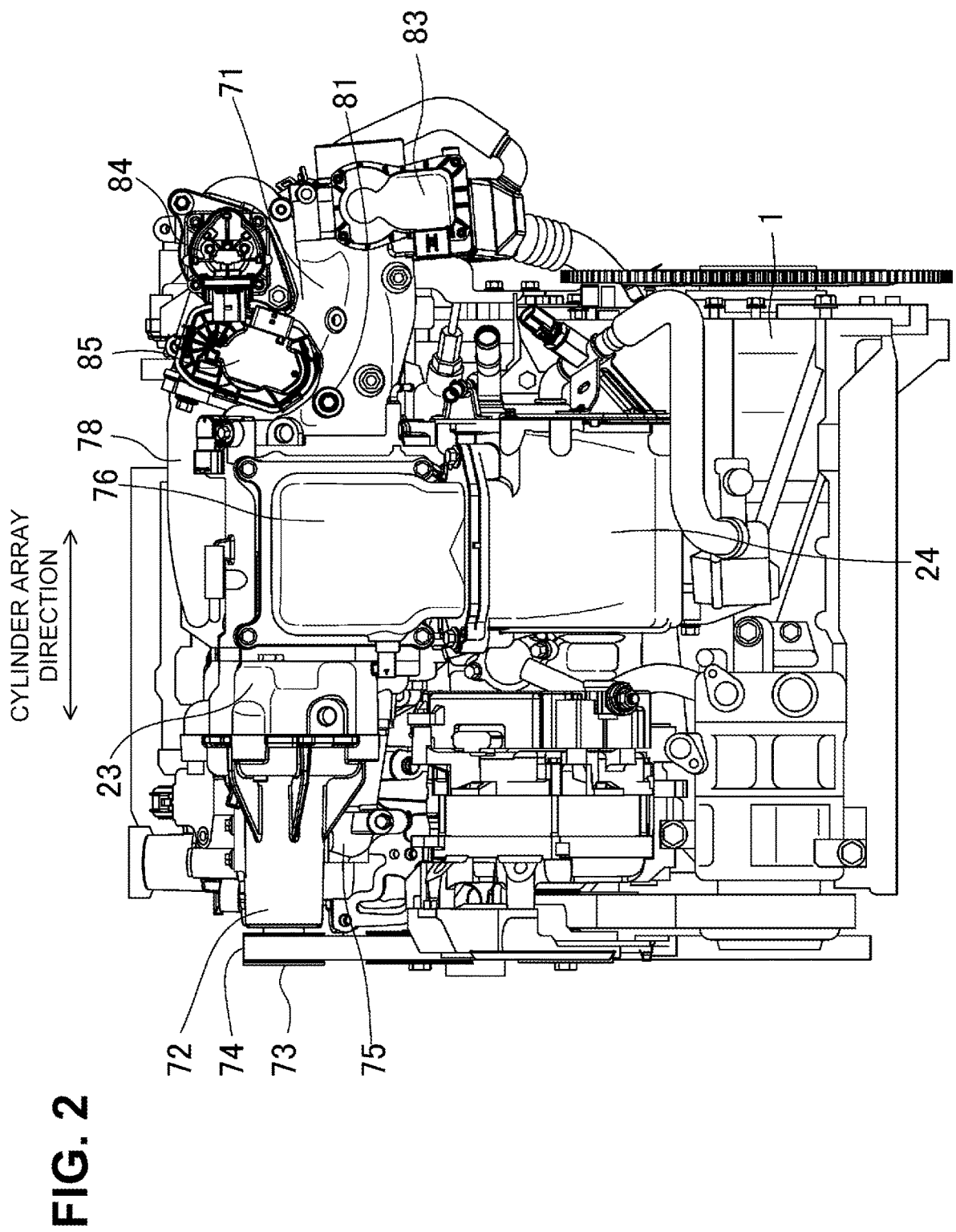
FIG. 2 is a front view of an engine.

As illustrated in FIG. 2, the supercharger 23 is provided in a state where an axis extends in a cylinder array direction in a portion above the engine 1. An upstream intake pipe 71 configuring the intake passage 2 extending in the cylinder array direction is coupled with this supercharger 23. A drive part housing 72 of the supercharger 23 protrudes toward the opposite side, in the supercharger 23, to the upstream intake pipe 71. The electromagnetic clutch 27 and a driving shaft for driving the supercharger 23 by the crankshaft of the engine 1 are housed in this drive part housing 72. A transmission belt 74 is wound around a pulley 73 coupled with the driving shaft.

An upstream end of an ejection duct 76 for leading pressurized intake air to a surge tank 75 (see FIG. 4) extending in the cylinder array direction is connected with a side surface of the supercharger 23. The ejection duct 76 extends to a lower side of the supercharger 23, and a lower end thereof is connected with the intercooler 24 arranged below the supercharger 23.

Figure 3:
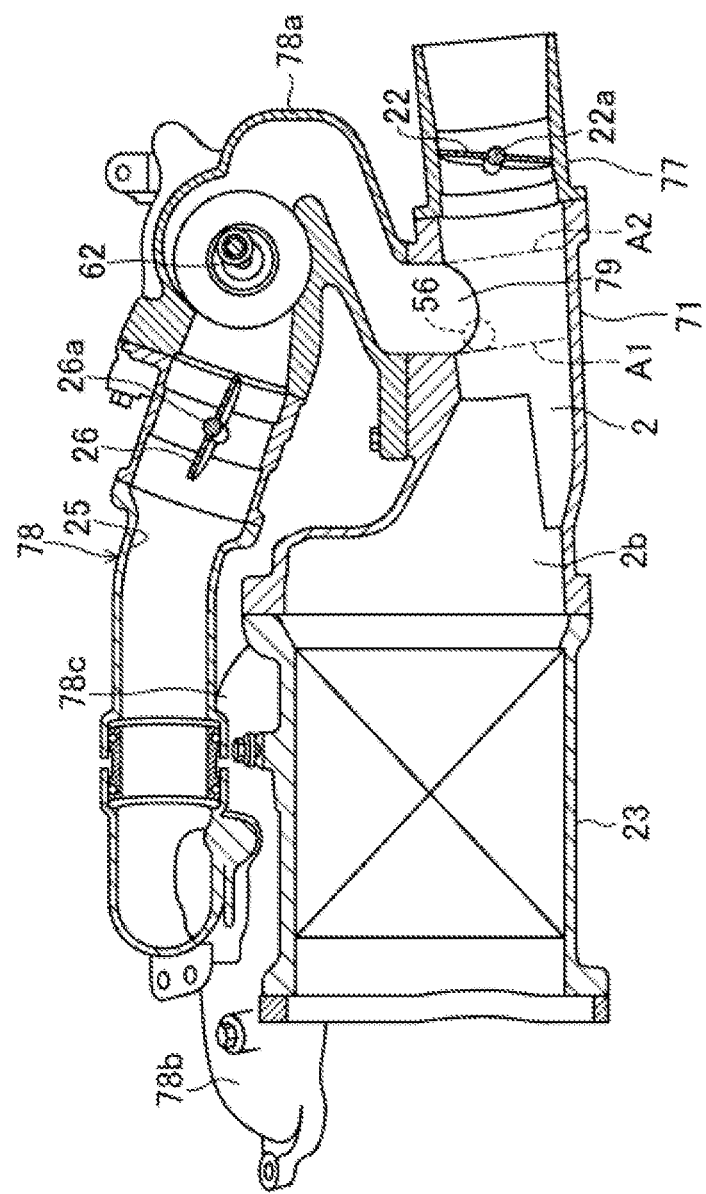
FIG. 3 is a cross-sectional view of an intake system of the engine.

As illustrated in FIG. 3, a throttle body 77 including the throttle valve 22 is provided to an upstream end portion of the upstream intake pipe 71. The throttle valve 22 is a butterfly valve, and a valve shaft 22a thereof is horizontally provided. On a downstream side of the throttle body 77 (an upstream side of the supercharger 23), a bypass pipe 78 forming the bypass passage 25 obliquely rises from an upper surface of the upstream intake pipe 71 toward an upstream side of the upstream intake pipe 71. That is, on a downstream side of the throttle valve 22, a connection port 79 of the bypass passage 25 opens in a top portion of an upper half circumferential portion of the intake passage 2 formed with the upstream intake pipe 71. This upper half circumferential portion of the intake passage 2 corresponds to a half circumferential portion on one side in a case where the intake passage 2 is divided into two portions by a plane extending in the longitudinal direction of the intake passage 2 through the axis of the valve shaft 22a of the throttle valve 22.

On a downstream side of the connection port 79 of the bypass passage 25, the upstream intake pipe 71 forms a passage expanding portion 2b in which a passage cross-sectional area expands toward the supercharger 3, and an expanding end thereof is connected with the supercharger 3.

The bypass pipe 78 has a folded portion 78a that is continuous with the above-described oblique rising portion and is folded, in a curved manner, toward a downstream side of the upstream intake pipe 71. The bypass pipe 78 is continuous with the folded portion 78a and extends toward a central side of the surge tank 75 in the cylinder array direction above the supercharger 23. An EGR pipe (not illustrated) forming the EGR passage 6 is connected with a downstream side of the folded portion 78a in the bypass pipe 78, and the EGR valve 62 is provided to this connection portion.

As illustrated in FIG. 3, in the vicinity of a central portion of the surge tank 75 (see FIG. 4), the bypass pipe 78 branches to a first branch pipe 78b extending in one direction of the cylinder array direction and a second branch pipe 78c extending in the other direction of the cylinder array direction. Both of the branch pipes 78b and 78c are connected with the surge tank 75. Further, the bypass valve 26 is provided in the bypass pipe 78 on a downstream side of the EGR valve 62. The bypass valve 26 is a butterfly valve, and a valve shaft 26a thereof is horizontally provided.

Figure 4:
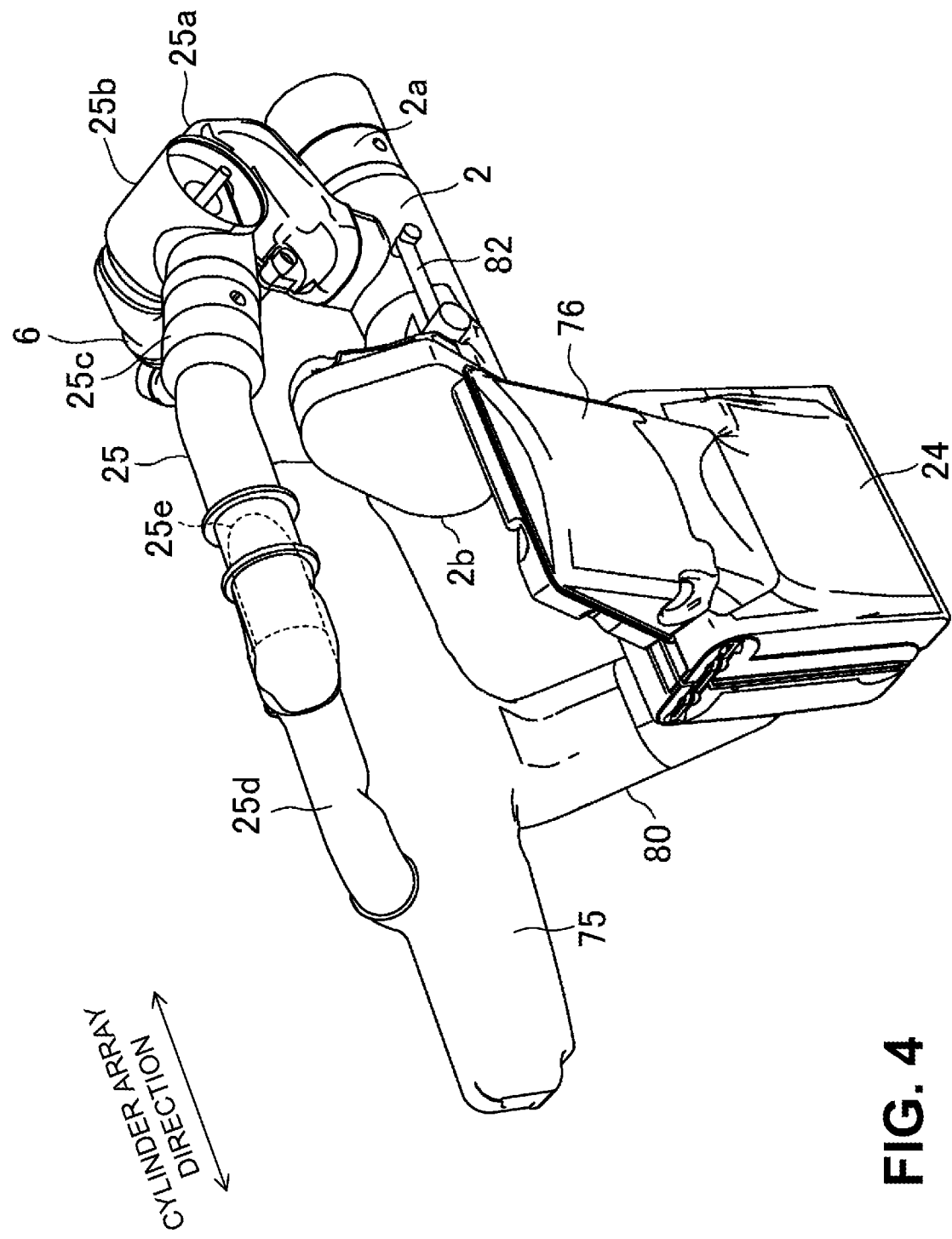
FIG. 4 is a perspective view of the intake system of the engine.

FIG. 4 extracts and illustrates passage portions from the above-described intake-system pipe structure. The intake passage 2 of the upstream intake pipe 71 extends in the cylinder array direction. On a downstream side of a throttle portion 2a of the intake passage 2, the bypass passage 25 obliquely rises from the top portion of the upper half circumferential portion of the intake passage 2. The bypass passage 25 extends via a folded portion 25a continuous with a rising portion toward the surge tank 75 in the cylinder array direction.

An EGR valve portion 25b and a bypass valve portion 25c are provided in an upstream portion of a portion of the bypass passage 25, the portion extending in the cylinder array direction. A downstream portion of the bypass passage 25 is connected with the surge tank 75 by branch portions 25d and 25e related to the branch pipes 78b and 78c. An intake air introduction passage 80 is integrally provided to the surge tank 75. The intake air introduction passage 80 extends to a lower side of the surge tank 75 and is connected with the intercooler 24.

Figure 5:
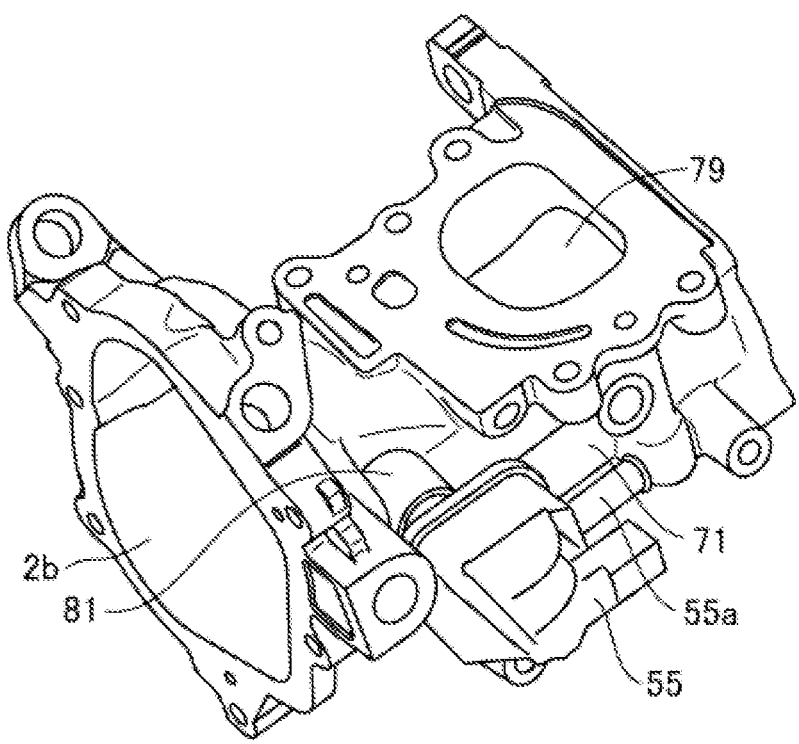
FIG. 5 is a perspective view illustrating a mounting portion for mounting a purge valve on an intake pipe.

Next, a description will be made about an introduction portion of the evaporated fuel to the intake passage 2. As illustrated in FIG. 2, a mounting portion 81 of the purge valve 55 is provided to a side surface of the upstream intake pipe 71. As illustrated in FIG. 5, the purge valve 55 is mounted on the mounting portion 81 on the side surface of the upstream intake pipe 71. A purge pipe (not illustrated) forming the purge passage 53 is connected with a connection portion 55a of this purge valve 55.

Figure 6:
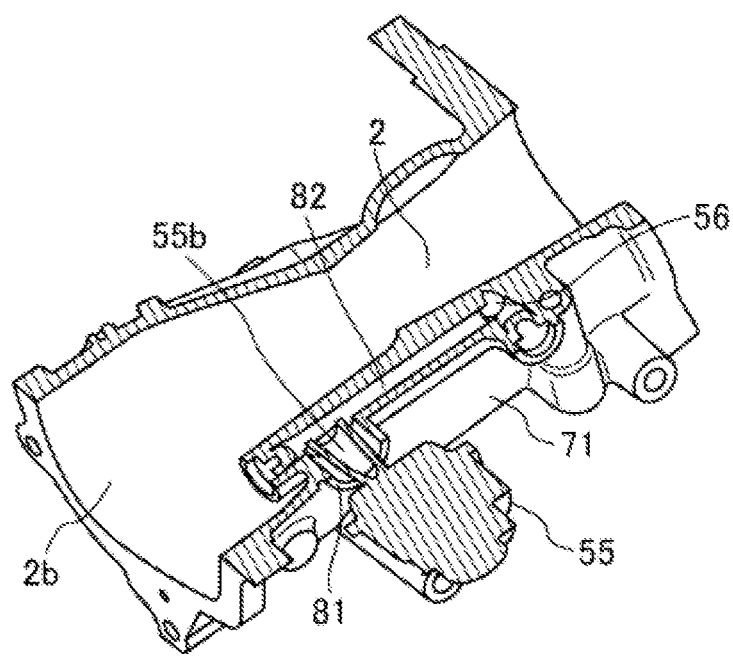
FIG. 6 is a cross-sectional view of the mounting portion.

As illustrated in FIG. 6, a purge passage hole 82 extending from the mounting portion 81 of the purge valve 55 toward an upstream side of the intake passage 2 is formed in a passage wall, of the upstream intake pipe 71, forming the intake passage 2. An upstream end of this purge passage hole 82 communicates with an evaporated fuel supply hole 55b of the purge valve 55, and a downstream end opens as the evaporated fuel introduction opening 56 to the intake passage 2. An opening position of this evaporated fuel introduction opening 56 is a section in the intake passage 2 in which a bypass-directed flow of intake air described later is generated.

Figure 7:
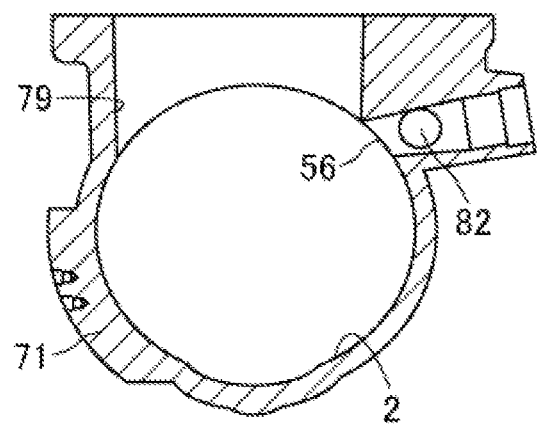
FIG. 7 is a cross-sectional view illustrating an evaporated fuel introduction opening of the intake pipe.

As illustrated in FIG. 7, the evaporated fuel introduction opening 56 opens in the vicinity of the connection port 79 of the bypass passage 25 in the intake passage 2. Specifically, the evaporated fuel introduction opening 56 opens in a side wall of the intake passage 2 (side walls in quadrant ranges of the intake passage, the side walls being opposed to each other in the direction of the valve shaft 22a of the throttle valve 22) and more specifically opens on an upper half circumferential side of the side wall of the intake passage 2.

As illustrated in FIG. 3, a side wall range of the intake passage 2 in which the evaporated fuel introduction opening 56 preferably opens is a range demarcated by lines A1 and A2 extending in the circumferential direction of the intake passage 2 while passing through both ends, in the longitudinal direction of the intake passage, of the connection port 79 of the bypass passage 25. It is preferable that at least a portion of the evaporated fuel introduction opening 56 open in this side wall range. Accordingly, the evaporated fuel introduced from the evaporated fuel introduction opening 56 into the intake passage 2 is easily blended with the bypass-directed flow of the intake air described later.

Note that in FIG. 2, a reference numeral 83 denotes a drive part of the throttle valve 22, a reference numeral 84 denotes a drive part of the bypass valve 26, and a reference numeral 85 denotes a drive part of the EGR valve 62.

<Flow of Intake Air in Intake Passage>

When the air-fuel ratio of the engine 1 can properly be controlled, that is, in a low-load to medium-load operation range of the engine 1 in which the throttle valve 22 is in a partially open state, the evaporated fuel is introduced from a purge passage 82 to the intake passage 2. When the throttle valve 22 is in the partially open state, gaps between an inner peripheral surface of the intake passage 2 and a valve-plate outer peripheral edge of the throttle valve 22 are widest at respective top portions of the upper half circumferential portion and a lower half circumferential portion of the intake passage 2, the upper and lower half circumferential portions being opposed to each other in a direction perpendicular to the valve shaft 22a of the throttle valve 22, and become narrower from the top portions toward both sides thereof.

Figure 8:
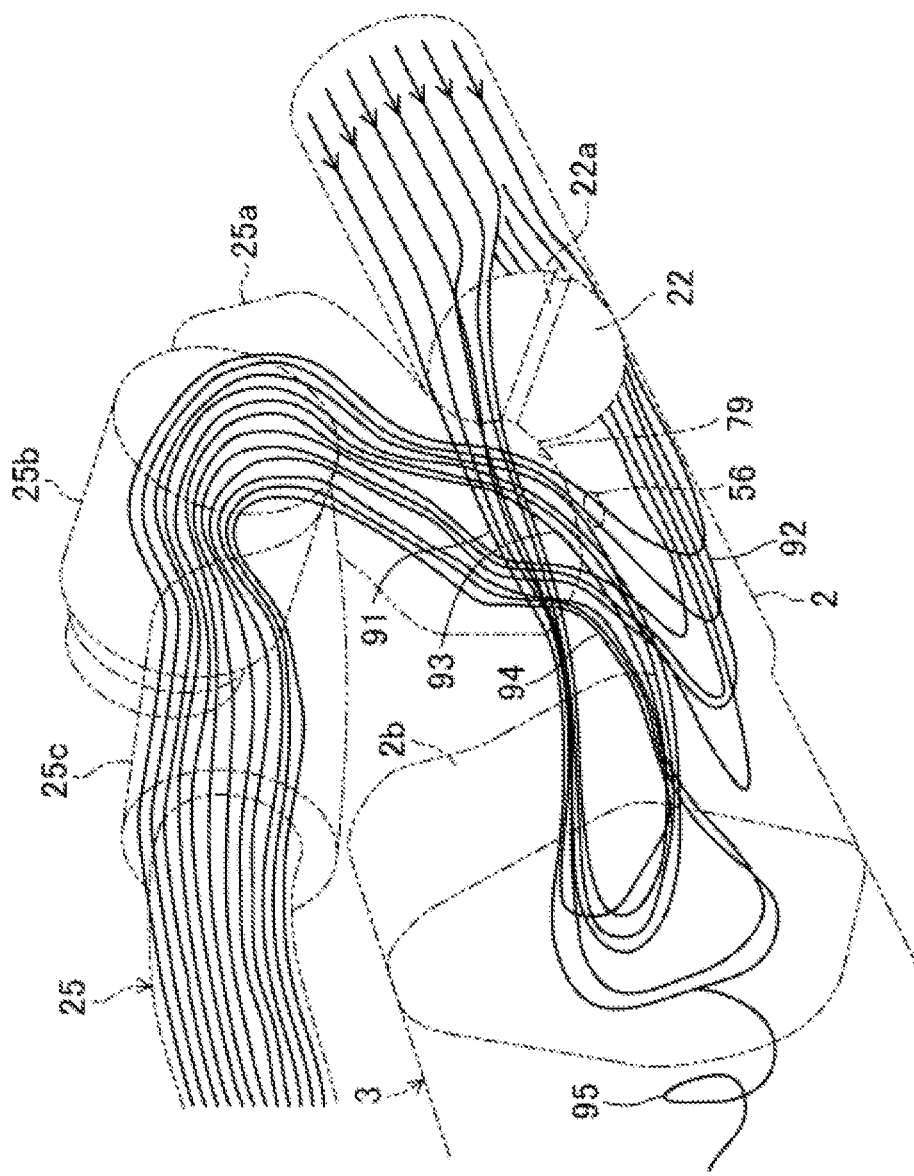
FIG. 8 is a perspective view illustrating a flow of intake air in an intake passage.

FIG. 8 illustrates a result of an analysis of the flow of intake air in a case where the throttle valve 22 is partially opened when the supercharger 3 is not acting (the bypass valve 26 is fully opened).

Because the gaps between the inner peripheral surface of the intake passage 2 and the valve-plate outer peripheral edge of the throttle valve 22 are as described above, the intake air is split into, in the simplest of terms, an upper half circumferential side and a lower half circumferential side of the intake passage 2 when the intake air gets through the throttle valve 22. In addition, the intake air gains the highest flow speeds in the respective top portions of the upper half circumferential portion and the lower half circumferential portion of the intake passage 2 and moves toward the supercharger 3. Because forward movement of those forward flows 91 and 92, on an upper side and a lower side, moving toward the supercharger 3 is blocked by the supercharger 3, most of the intake air is reversed in a position close to the supercharger 3 and becomes bypass-directed flows 93 and 94 flowing from the supercharger 3 side toward the connection port 79, of the bypass passage 25, opening in the intake passage 2. Note that a portion of the intake air gets through the supercharger 3 and leaks to a downstream side thereof as indicated by a flow line 95.

Next, reversal of the intake air and bypass-directed flows will be described. On the downstream side of the connection port 79 of the bypass passage 25, a passage cross-sectional area of the intake passage 2 expands toward the supercharger 3. When forward movement is blocked by the supercharger 3, the intake air attempts to flow to a portion with low resistance and easily generates a certain reversal route, in which the intake air flows to a portion with low resistance, in a position close to the supercharger 3 due to expansion of the above passage cross-sectional area and lowering of a forward flow speed of the intake air due to this expansion.

In a case of this embodiment, the upper side forward flow 91 and the lower side forward flow 92 that respectively flow on the upper half circumferential side and the lower half circumferential side of the intake passage 2 extend to a position close to the supercharger 3. Consequently, in a position close to the supercharger 3, the intake air is reversed toward a portion with low resistance between the upper side forward flow 91 and the lower side forward flow 92.

While the reversed intake air moves toward the connection port 79 of the bypass passage 25, the connection port 79 opens in the top portion of the upper half circumferential portion of the intake passage 2. In the vicinity of the connection port 79 in the intake passage 2, the upper side forward flow 91 is present in which the intake air flows at a high flow speed along the top portion of the upper half circumferential portion of the intake passage 2. Consequently, the intake air reversed in a position close to the supercharger 3 returns toward the throttle valve 22 in the portion between the upper side forward flow 91 and the lower side forward flow 92 (a portion with low resistance) and further moves upward toward the connection port 79 of the bypass passage 25 while getting through both peripheries of the upper side forward flow 91 (portions with low resistance).

That is, the bypass-directed flow 93 moving from the portion between the upper side forward flow 91 and the lower side forward flow 92 toward the connection port 79 of the bypass passage 25 and moving upward along the side wall on one side of the intake passage 2 through a periphery on one side of the upper side forward flow 91 and the bypass-directed flow 94 moving upward along the side wall on the opposite side of the intake passage 2 through a periphery on the opposite side of the upper side forward flow 91 are generated.

<Purging of Evaporated Fuel to Intake Passage>

As illustrated in FIG. 7, the evaporated fuel introduction opening 56 of the purge passage 53 opens in a side wall portion in the intake passage 2 in the vicinity of the connection port 79 of the bypass passage 25. This opening position is a section in which the intake air in the bypass-directed flow 93 moves upward along the side wall of the intake passage 2. Consequently, the evaporated fuel introduced from the evaporated fuel introduction opening 56 flows into the bypass passage 25 while being blended with the intake air, of the bypass-directed flow 93, moving upward. In particular, because the evaporated fuel introduction opening 56 is opened in the vicinity of the connection port 79 in which the bypass-directed flow becomes strong, the evaporated fuel introduced from the evaporated fuel introduction opening 56 is easily blended with the intake air, of the bypass-directed flow 93, moving upward.

As described above, because the evaporated fuel flows into the bypass passage 25 while being blended with the intake air, of the bypass-directed flow 93, moving upward, the evaporated fuel can be inhibited from leaking from the supercharger 3 to a downstream side thereof. Thus, a situation can be prevented in which when the supercharger is caused to act, the fuel accumulated in the downstream side of the supercharger 3 and so forth is at once introduced into the combustion chambers and an over-rich condition occurs. That is, degradation of emission and a torque shock can be prevented.

Furthermore, because the evaporated fuel introduction opening 56 opens on the upper half circumferential side of the side wall of the intake passage 2, even if the intake air containing the EGR gas flows from the connection port 79 of the bypass passage 25 into the intake passage 2, the EGR gas can be prevented from entering the purge passage 53 from the evaporated fuel introduction opening 56. That is, the fact that the evaporated fuel introduction opening 56 opens on the upper half circumferential side of the side wall of the intake passage 2 means that the evaporated fuel introduction opening 56 opens obliquely downward. Consequently, the EGR gas can be prevented from entering the evaporated fuel introduction opening.

Note that in the present invention, the opening position of the evaporated fuel introduction opening 56 is not limited to the vicinity of the connection port 79 of the bypass passage 25, but the evaporated fuel introduction opening 56 may be in any position as long as it is a position in which the bypass-directed flow in the intake passage 2 is generated.

REFERENCE CHARACTERS LIST 1 engine
2 intake passage
2b passage expanding portion
3 exhaust passage
4 fuel tank
10 combustion chamber
22 throttle valve
22a valve shaft
23 supercharger
25 bypass passage
53 purge passage
56 evaporated fuel introduction opening
79 connection port of bypass passage
91 upper side forward flow
92 lower side forward flow
93 bypass-directed flow
94 bypass-directed flow
A1 demarcation line
A2 demarcation line

The invention claimed is:

1. An evaporated fuel treatment device for an engine, the evaporated fuel treatment device comprising:
   an intake passage leading intake air to a combustion chamber of the engine;
   a throttle valve provided in the intake passage;
   a supercharger provided on a downstream side of the throttle valve in the intake passage;
   a bypass passage connecting an upstream side with a downstream side of the supercharger in the intake passage on a downstream side of the throttle valve and opening when the supercharger is not acting; and
   a purge passage leading evaporated fuel produced in a fuel tank to a section in the intake passage on a downstream side of the throttle valve and on an upstream side of the supercharger, the evaporated fuel treatment device being characterized in that
   when the supercharger is not acting, the intake passage generates a forward flow in which the intake air flows from the throttle valve toward the supercharger and a bypass-directed flow in which the intake air is reversed due to blockage of forward movement by the supercharger and flows from a side of the supercharger toward a connection port, of the bypass passage, opening in the intake passage on an upstream side of the supercharger, and
   an evaporated fuel introduction opening of the purge passage opens in a wall surface, on which the bypass-directed flow is generated, in the intake passage.

2. The evaporated fuel treatment device for an engine according to claim 1, characterized in that
   the throttle valve is a valve of a butterfly type, and
   the connection port of the bypass passage opens in a half circumferential portion on one side of the intake passage in a case where the intake passage is divided into two portions by a plane extending in a longitudinal direction of the intake passage through an axis of a valve shaft of the throttle valve.

3. The evaporated fuel treatment device for an engine according to claim 2, characterized in that
the connection port of the bypass passage opens in a top portion of the half circumferential portion on the one side of the intake passage, and the evaporated fuel introduction opening opens in side walls of the intake passage, the side walls being opposed to each other in a valve shaft direction of the throttle valve.

4. The evaporated fuel treatment device for an engine according to claim 3, characterized in that
the evaporated fuel introduction opening opens in a section in the intake passage, in which the bypass-directed flow is generated, in a vicinity of the connection port of the bypass passage.

5. The evaporated fuel treatment device for an engine according to claim 4, characterized in that
a passage portion of the intake passage from a section, in which the throttle valve is provided, to the supercharger extends in a cylinder array direction of the engine,
the valve shaft of the throttle valve is substantially horizontally provided,
the connection port of the bypass passage opens in a top portion of an upper half circumferential portion of the intake passage, and
the evaporated fuel introduction opening opens in a section, in which the bypass-directed flow is generated, of a side wall of the intake passage.

6. The evaporated fuel treatment device for an engine according to claim 5, characterized in that
the evaporated fuel introduction opening opens on an upper half circumferential side of a side wall portion of the intake passage.

7. The evaporated fuel treatment device for an engine according to claim 6, characterized in that
on a downstream side of the connection port of the bypass passage, a passage cross-sectional area of the intake passage expands toward the supercharger.

8. The evaporated fuel treatment device for an engine according to claim 1, characterized in that
on a downstream side of the connection port of the bypass passage, a passage cross-sectional area of the intake passage expands toward the supercharger.

9. The evaporated fuel treatment device for an engine according to claim 2, characterized in that
the evaporated fuel introduction opening opens in a section in the intake passage, in which the bypass-directed flow is generated, in a vicinity of the connection port of the bypass passage.

10. The evaporated fuel treatment device for an engine according to claim 2, characterized in that
a passage portion of the intake passage from a section, in which the throttle valve is provided, to the supercharger extends in a cylinder array direction of the engine,
the valve shaft of the throttle valve is substantially horizontally provided,
the connection port of the bypass passage opens in a top portion of an upper half circumferential portion of the intake passage, and
the evaporated fuel introduction opening opens in a section, in which the bypass-directed flow is generated, of a side wall of the intake passage.

11. The evaporated fuel treatment device for an engine according to claim 2, characterized in that
on a downstream side of the connection port of the bypass passage, a passage cross-sectional area of the intake passage expands toward the supercharger.

12. The evaporated fuel treatment device for an engine according to claim 3, characterized in that
a passage portion of the intake passage from a section, in which the throttle valve is provided, to the supercharger extends in a cylinder array direction of the engine,
the valve shaft of the throttle valve is substantially horizontally provided,
the connection port of the bypass passage opens in a top portion of an upper half circumferential portion of the intake passage, and
the evaporated fuel introduction opening opens in a section, in which the bypass-directed flow is generated, of a side wall of the intake passage.

13. The evaporated fuel treatment device for an engine according to claim 3, characterized in that
on a downstream side of the connection port of the bypass passage, a passage cross-sectional area of the intake passage expands toward the supercharger.

14. The evaporated fuel treatment device for an engine according to claim 4, characterized in that
on a downstream side of the connection port of the bypass passage, a passage cross-sectional area of the intake passage expands toward the supercharger.

15. The evaporated fuel treatment device for an engine according to claim 5, characterized in that
on a downstream side of the connection port of the bypass passage, a passage cross-sectional area of the intake passage expands toward the supercharger.

16. The evaporated fuel treatment device for an engine according to claim 9, characterized in that
a passage portion of the intake passage from a section, in which the throttle valve is provided, to the supercharger extends in a cylinder array direction of the engine,
the valve shaft of the throttle valve is substantially horizontally provided,
the connection port of the bypass passage opens in a top portion of an upper half circumferential portion of the intake passage, and
the evaporated fuel introduction opening opens in a section, in which the bypass-directed flow is generated, of a side wall of the intake passage.

17. The evaporated fuel treatment device for an engine according to claim 9, characterized in that
on a downstream side of the connection port of the bypass passage, a passage cross-sectional area of the intake passage expands toward the supercharger.

18. The evaporated fuel treatment device for an engine according to claim 10, characterized in that
the evaporated fuel introduction opening opens on an upper half circumferential side of a side wall portion of the intake passage.

19. The evaporated fuel treatment device for an engine according to claim 12, characterized in that
the evaporated fuel introduction opening opens on an upper half circumferential side of a side wall portion of the intake passage.

20. The evaporated fuel treatment device for an engine according to claim 16, characterized in that
the evaporated fuel introduction opening opens on an upper half circumferential side of a side wall portion of the intake passage.

* * * * *